United States Patent Office

3,340,285
Patented Sept. 5, 1967

3,340,285
PROCESS FOR PREPARING DIORGANO ANTIMONY (III) CARBOXYLATES AND MERCAPTIDES
Nathaniel L. Remes, Livingston, and John J. Ventura, East Brunswick, N.J., assignors to M & T Chemicals Inc., New York, N.Y., a corporation of Delaware
No Drawing. Filed Apr. 24, 1964, Ser. No. 362,465
17 Claims. (Cl. 260—446)

This invention relates to a novel process for preparing organoantimony compounds.

Organostibine compounds of the formula $R_2SbX$ wherein R is a hydrocarbon group and X is an anionic group such as mercaptide, carboxylate, etc., may be employed as stabilizers, bactericides, germicides, etc. Such compounds have not, however, enjoyed wide commercial use because of a lack of a convenient method for preparing them in high yield and purity. It has been shown, for example, that the dihydrocarbonstibine compounds of the formula $R_2SbX$ cannot be prepared in the same manner as the monohydrocarbonstibine compounds, $RSbX_2$. Attempts to prepare $R_2SbX$ from available starting materials, e.g. $(R_2Sb)_2O$ have resulted in cleavage of one of the R groups and, consequently, formation of $RSbX_2$ rather than the desired $R_2SbX$.

It is an object of this invention to provide a novel process characterized by its ability to produce high yields of high purity dihydrocarbonstibine compounds. Other objects will become apparent to those skilled in the art upon reading the following disclosure.

In accordance with certain of its aspects, the process of this invention for preparing a compound of the formula $R_2SbZR'$ wherein R and R' are independently selected from the group consisting of alkyl, aryl, and alkenyl; Z is selected from the group consisting of —OOC— and —S—; and ZR' contains at least 4 carbon atoms, comprises mixing together HZR' and $R_2SbOOCR''$ wherein R'' is an alkyl radical containing less than 4 carbon atoms and fewer carbon atoms than R', thereby forming product $R_2SbZR'$ and by-product HOOCR''; and separating said by-product from said product.

In accordance with this invention, organostibine compounds of the formula $R_2SbZR'$ may be prepared from $R_2SbOOCR''$ wherein R is selected from the group consisting of alkyl, aryl, and alkenyl. Typical alkyls may include methyl, ethyl, n-propyl, isopropyl, n-butyl, isobutyl, sec-butyl, tert-butyl, amyl, hexyl, octyl, decyl, dodecyl, octadecyl, cyclohexyl, cycloheptyl, etc. Typical aryls may include phenyl, naphthyl, phenanthryl, etc. Typical alkenyls may include vinyl, allyl, 1-propenyl, 1-butenyl, 2-butenyl, 3-butenyl, etc. The radical R may be an inertly substituted alkyl, aryl, or alkenyl radical, i.e. it may bear a substituent which does not react with other components of the process or interfere with the reaction. Typical inert substituents may include halogen, nitro, ether, aryl, alkyl, etc. Typical inertly substituted R radicals may include chlorophenyl, nitrophenyl, benzyl, tolyl, ethylphenyl, phenylethyl, chlorobutyl, 2-ethylhexyl, ethoxyethyl, methylcyclohexyl, 4-chloro-3-butenyl, etc. Preferably, R may be aryl and most preferably it may be phenyl.

In the compound $R_2SbOOCR''$, R'' may be an alkyl radical containing less than 4 carbon atoms and fewer carbon atoms than R'. For example, R'' may be methyl, ethyl, n-propyl, isopropyl, etc. R'' may be inertly substituted, i.e. it may bear substituents which do not react with the other components and do not interfere with the desired reaction. Typical inert substituents may include halogen, ether, etc. and R'' may be, for example, 3-chloro-propyl, 2-ethoxyethyl, etc. Preferably R'' may be unsubstituted and most preferably R'' may be methyl.

The group —OOCR'' may be the negative residual portion of an organic carboxylic acid, i.e. the residual portion obtained by removal of a proton from the carboxylate group. Typically, —OOCR'' may be the negative residual portion of acetic acid; propionic acid; α-methylpropionic acid; butyric acid; etc. Preferably —OOCR'' may be the negative residual portion of acetic acid, i.e. the acetate anion.

In accordance with certain aspects of this invention, the reactant $R_2SbOOCR''$ may typically include:
diphenylstibine acetate
diphenylstibine propionate
diphenylstibine butyrate
ditolylstibine α-methylpropionate
dixylylstibine α-methylpropionate
di-α-naphthylstibine acetate
ditolylstibine butyrate
bis(p-chlorophenyl)stibine γ-chlorobutyrate
diphenylstibine β-ethoxypropionate
diethylstibine acetate
di-n-propylstibine propionate
di-n-butylstibine α-methylpropionate
di-n-octylstibine propionate
dilaurylstibine butyrate
bis(2-ethylhexyl) stibine α-methylpropionate
di-n-hexylstibine acetate
diallylstibine acetate
di-2-butenylstibine propionate
dibenzylstibine α-methylpropionate
dicyclohexylstibine acetate These compounds may be readily available, or they may readily be prepared. For example, three moles of Grignard reagent RMgCl, say phenylmagnesium chloride, may be reacted with one mole of $SbCl_3$ to give $R_3Sb$, say triphenylstibine. Two moles of $R_3Sb$ may then be reacted with one mole of $SbCl_3$ to give $R_3SbCl$, say diphenylstibine chloride, which may be further reacted with NaOOCR'', say sodium acetate, to give $R_2SbOOCR''$, say diphenylstibine acetate. In addition to their usefulness in the process of this invention, these compounds are useful as bactericides, stabilizers, etc.

The compound $R_2SbOOCR''$ may be reacted with HZR' wherein Z is selected from the group consisting of —OOC— and —S—; R' is selected from the group consisting of alkyl, aryl, and alkenyl; and the moiety ZR' contains at least 4 carbon atoms. The total number of carbon atoms in the group —ZR' may be at least 4— when Z is —OOC—, R' may contain at least 3 carbon atoms; when Z is —S—, R' may contain at least 4 carbon atoms thereby maintaining a total of at least 4 carbon atoms in ZR'. R' may be alkyl, including propyl (when Z is —OOC—), n-butyl, isobutyl, t-butyl, sec-butyl, n-amyl, isoamyl, 2-methylbutyl, 3-methylbutyl, 3-amyl, tert-amyl, hexyl, octyl, undecyl, dodecyl, heptadecyl, octadecyl, cyclohexyl, etc. R' may may be aryl, including phenyl, naphthyl, phenanthryl, etc. R' may be alkenyl, including 3-butenyl, 2-pentenyl, 3-pentenyl, octenyl, heptadecenyl, octadecenyl, etc. R' may also bear inert substituents, including halogen, nitro, ether, alkyl, aryl, etc. substituents. Typical inertly substituted R' groups may include benzyl, tolyl, xylyl, chlorophenyl, p-anisyl, nitrophenyl, p-ethylphenyl, 2-phenylethyl, phenoxymethyl, 2-ethylhexyl, etc.

When Z is —S—, HZR' may be HSR', a mercaptan or thiol. Typical HSR' compounds include n-butane-1-thiol, n-butane-2-thiol, n-pentane-1-thiol, isopentane-1-thiol, 3-methylbutane-1-thiol, n-pentane-2-thiol, n-hexanethiol, n-octanethiol, dodecanethiol, octadecanethiol, cyclohexanethiol, thiophenol, β-thionaphthol, thiocresol, 3-pentene-1-thiol, p-chlorothiophenol, pentachlorothiophenol, α-toluenethiol, etc.

When Z is —OOC—, HZR' may be HOOCR' a carboxylic acid. Typical HOOCR' compounds may include butyric acid, valeric acid, caproic acid, α-methylvaleric acid, β-methylvaleric acid, α-ethylcaproic acid, caprylic acid, pelargonic acid, capric acid, lauric acid, stearic acid, oleic acid, benzoic acid, p-toluic acid, p-ethylbenzoic acid, α-naphthoic acid, phenylacetic acid, phenoxyacetic acid, linoleic acid, cyclohexanoic acid, tetrachlorobenzoic acid, etc. Other suitable HOOCR' compounds are the known commercial carboxylic acids such as tall oil fatty acids, rosin acids, etc.

The radical R" may contain fewer carbon atoms than the radical R'. For example, when Z is —OOC—; and R' contains 3 carbon atoms, i.e. the propyl radical; ZR' is the butyrate anion. In this case, R" shall contain fewer than 3 carbon atoms, i.e. it may me methyl or ethyl and —OOCR" may be the acetate or propionate anion.

The compounds R₂SbOOCR" and HZR' may be mixed together and reacted according to the equations:

$$R_2SbOOCR'' + HZR' \rightarrow R_2SbZR' + HOOCR'' \quad (I)$$

When Z is —S—, reaction (I) may become:

$$R_2SbOOCR'' + HSR' \rightarrow R_2SbSR' + HOOCR'' \quad (II)$$

When Z is —OOC—, reaction (I) may become:

$$R_2SbOOCR'' + HOOCR' \rightarrow R_2SbOOCR' + HOOCR'' \quad (III)$$

In accordance with these reaction equations, one mole of R₂SbOOCR" may react with one mole of HZR' to give one mole of product R₂SbZR' and one mole of by-product HOOCR". The reaction may be carried out with various molar ratios of R₂SbOOCR" and HZR'. Since the latter compound is generally the less expensive reactant and is also easier to remove from the desired product, it may preferably be employed in the amount of at least one mole per mole of R₂SbOOCR". If desired, excesses of HZR' may be employed, typically as high as 10% excess. Preferably, the two reactants may be mixed in substantially stoichiometric, i.e. equimolar, quantities.

The reaction may most preferably be carried out in the presence of an inert liquid organic solvent, i.e. a solvent which does not react with the reactants or products or otherwise interfere with the reaction. The inert organic solvent may typically be a hydrocarbon solvent, including inertly substituted hydrocarbons. Preferably, the inert organic solvent may have a boiling point which is higher than the boiling point of by-product HOOCR" or it may form a low-boiling azeotrope with HOOCR". Typically it may have a boiling point of about 70–250° C. in the presence of HOOCR". Illustrative preferred inert organic solvents include toluene, cyclohexane, benzene, xylene, chlorobenzene, etc. Most preferably, the inert organic solvent may be toluene. The inert organic solvent may typically be employed in the amount of about 500–5,000 parts by weight per 200 parts by weight of total reactants and preferably 1,000–3,000 parts by weight, say 3,000 parts by weight per 200 parts by weight of total reactants.

Reaction of R₂SbOOCR" and HZR' may be effected by mixing them together, preferably together with an inert organic solvent. Since reaction (I) supra is an equilibrium reaction, the by-product HOOCR" may preferably be removed from the reaction site continuously throughout the reaction. Preferably, this may be accomplished by distilling off HOOCR", either directly or azeotropically, as it is formed. If desired, means may be provided for removing HOOCR" from the distillate, and returning the remainder of the distillate to the reaction vessel.

The reaction mixture may preferably be heated to accelerate the reaction and to distill off by-product HOOCR". Preferably, it may be heated to at least the temperature at which HOOCR" distills, either directly or as an azeotrope with the inert organic solvent. This may typically correspond to a temperature of about 70–170° C. and preferably 75–130° C., say 105° C. The reaction may be continued until no further HOOCR" is evolved, typically for about 2–48 hours.

At the completion of the reaction, the remaining solution may be filtered, and residual solvent may be removed by distillation, together with any remaining HOOCR" or volatile HZR' if present. Preferably, distillation of solvent may be carried out under reduced pressure, say 0.1–50 mm. Hg. Product R₂SbZR' may be recovered as a liquid, an oil, or a solid, depending upon the particular reactants employed. Typically, the desired product may be prepared by the process of this invention in high yield, say 80–99% of theory. It is a particular feature of this invention that the product obtained may be substantially free from undesired contaminants. If desired, products may be recrystallized from a suitable solvent, say cyclohexane.

During the reaction and isolation of the product, it may be desirable to maintain an inert atmosphere, typically nitrogen or refluxing inert organic solvent, to prevent undesirable oxidation reactions. In particular, the dialkylstibine and dialkenylstibine compounds may react readily with oxygen and may, therefore, require an inert atmosphere.

Illustrative compounds of the formula R₂SbZR' which may be prepared by the process of this invention include diphenylstibine n-butyl mercaptide
diphenylstibine n-amyl mercaptide
ditolylstibine isoamyl mercaptide
dixylylstibine 3-methyl-1-butyl mercaptide
diethylstibine 2-amyl mercaptide
di-n-propylstibine n-hexyl mercaptide
di-n-butylstibine n-octyl mercaptide
di-n-octylstibine lauryl mercaptide
dilaurylstibine octadecyl mercaptide
di-2-ethylhexylstibine cyclohexyl mercaptide
di-n-hexylstibine phenyl mercaptide
diallylstibine β-naphthyl mercaptide
di-2-butenylstibine tolyl mercaptide
dibenzylstibine p-chlorophenyl mercaptide
dicyclohexylstibine pentachlorophenyl mercaptide
diphenylstibine benzyl mercaptide
diphenylstibine lauryl mercaptide
diphenylstibine phenyl mercaptide
di-α-naphthylstibine n-amyl mercaptide
bis(p-chlorophenyl)stibine n-octyl mercaptide
diphenylstibine butyrate
diphenylstibine valerate
diphenylstibine caproate
ditolylstibine α-methylvalerate
dixylylstibine β-methylvalerate
diethylstibine α-ethylcaproate
di-n-propylstibine caprylate
di-α-naphthylstibine pelargonate
di-n-butylstibine caprate
di-n-octylstibine laurate
dilaurylstibine stearate
di-2-ethylhexylstibine oleate
di-n-hexylstibine benzoate
diallylstibine p-toluate
di-2-butenylstibine p-ethylbenzoate
dibenzylstibine α-naphthoate
dicyclohexylstibine phenylacetate
diphenylstibine phenoxyacetate
diphenylstibine linoleate
ditolylstibine cyclohexanoate
diphenylstibine tetrachlorobenzoate
diphenylstibine tallate
ditolylstibine rosinate
bis(p-chlorophenyl)stibine pelargonate
diphenylstibine p-chlorobenzoate Practice of certain specific embodiments of this novel invention may be observed from the following illustrative examples.

Example 1.—Diphenylstibine butyrate

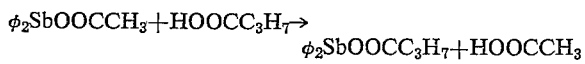

A solution of 67 grams (0.2 mole) of diphenylstibine acetate (M.P. 132° C.), and 88.1 grams (0.2 mole) of butyric acid in 400 ml. of toluene was slowly fractionated through a 60 cm. Vigreux column equipped with a total condensation fractionation head at a rate of about 1 ml./minute. The following fractions were collected:

| Degrees C. | Ml. |
| --- | --- |
| 84–100 | 3 |
| 103–105 | 17 |
| 105–107 | 80 |
| 108–110 | 130 |

The fractions boiling between 103–108° C. represent the toluene-acetic acid azeotrope [B.P. reported: 105° C. (Lange Handbook)]. The residue was stripped under vacuum at 50° C./40 mm. to dryness (71 grams; 98%). The product solidified upon cooling to a white crystalline mass. After recrystallization from cyclohexane, the melting point was 68–71° C.

*Analysis.*—Calcd. for $C_{16}H_{17}O_2Sb$: Sb, 33.54; Acid No. 154.5. Found: Sb, 33.90; Acid No. 157.0.

Example 2.—Diphenylstibine pentachlorophenyl mercaptide

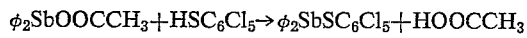

A solution of 117 grams (0.35 mole) of diphenylstibine acetate and 99 grams (0.35 mole) of pentachlorothiophenol in 1.5 liters of toluene was fractionally distilled through an eight inch Vigreux column at about a 1:5 reflux ratio. The acetic acid-toluene azeotrope was collected over the range of 105–107° C. Distillation was continued until the pot volume was about 500 ml. This solution was cooled to obtain a first crop of crystals, then concentrated and cooled to yield a second crop. The combined crops totalled 160 grams (82% of theory) and melted at 143–147° C. After recrystallization from cyclohexane, the melting point was 152–154° C.

*Analysis.*—Calcd. for $C_{18}H_{10}Cl_5SSb$: Sb, 21.85; S, 5.75; Cl, 31.81. Found: Sb, 21.90; S, 5.70; Cl, 31.50.

Example 3.—Diphenylstibine n-amyl mercaptide

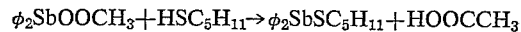

A solution of 67 grams (0.2 mole) of diphenylstibine acetate and 20.8 grams (0.2 mole) n-pentanethiol was fractionated through an eight inch Vigreux column. The toluene-acetic acid azeotrope was collected over a range of 104–106° C. After about two hours, the reflux temperature had risen to 110° C. and the distillation was stopped. The remaining solution was filtered and the remaining toluene stripped from the filtrate at about 10 mm. pressure. The product was isolated as a yellow oil (67.0 grams, 88% of theory) having a boiling point of 164° C. at 0.02 mm.

*Analysis.*—Calcd. for $C_{17}H_{21}SSb$: Sb, 32.11; S, 8.46. Found: Sb, 31.50; S, 7.30.

As may readily be seen from the foregoing examples, practice of this invention unexpectedly premits preparation of the compounds $R_2SbZR'$ in high yield and purity.

Although this invention has been illustrated by reference to specific examples, numerous changes and modifications thereof which clearly fall within the scope of the invention will be apparent to those skilled in the art.

We claim:
1. The process for preparing a compound of the formula $R_2SbZR'$ wherein R and R' are independently selected from the group consisting of alkyl, aryl, and alkenyl; Z is selected from the group consisting of —OOC— and —S—; and —ZR' contains at least 4 carbon atoms which comprises mixing together HZR' and $R_2SbOOCR''$ wherein R'' is an alkyl radical containing less than 4 carbon atoms and fewer carbon atoms than R', thereby forming product $R_2SbZR'$ and by-product HOOCR''; and separating said by-product from said product.

2. The process according to claim 1 wherein R'' is methyl.

3. The process according to claim 1 wherein R is aryl.

4. The process according to claim 1 wherein R is phenyl.

5. The process according to claim 1 wherein

and HZR' are mixed together in the presence of an inert organic solvent.

6. The process according to claim 1 wherein said by-product is separated from said product by distillation.

7. The process for preparing a compound of the formula $R_2SbZR'$ wherein R is aryl; R' is selected from the group consisting of alkyl, aryl and alkenyl; Z is selected from the group consisting of —OOC— and —S— and —ZR' contains at least 4 carbon atoms which comprises mixing together HZR' and $R_2SbOOCCH_3$; heating the so-formed mixture to a temperature of 70–170° C. thereby forming product $R_2SbZR'$ and by-product $HOOCCH_3$; and separating said by-product from said product.

8. The process according to claim 7 wherein said by-product is separated from said product by distillation.

9. The process according to claim 7 wherein

and HZR' are mixed together in the presence of an inert organic solvent having a boiling point of 70–250° C.

10. The process according to claim 7 wherein R is phenyl.

11. The process according to claim 7 wherein Z is —S—.

12. The process according to claim 7 wherein Z is —OOC—.

13. The process for preparing a compound of the formula $R_2SbZR'$ wherein R is phenyl; R' is selected from the group consisting of alkyl, aryl and alkenyl; Z is selected from the group consisting of —OOC— and —S—; and —ZR' contains at least 4 carbon atoms which comprises mixing together HZR' and $R_2SbOOCCH_3$ in the presence of an inert organic solvent having a boling point of 70–250° C.; and heating the so-formed mixture to a temperature of 70–170° C., thereby forming product $R_2SbZR'$ and by-product $HOOCCH_3$; and distilling said by-product from said product.

14. The process according to claim 13 wherein R' is alkyl.

15. The process according to claim 13 wherein R' is phenyl.

16. The process according to claim 13 wherein Z is —S—.

17. The process according to claim 13 wherein Z is —OOC—.

No references cited.

TOBIAS E. LEVOW, *Primary Examiner.*

W. F. W. BELLAMY, *Assistant Examiner.*